(12) United States Patent
Singh et al.

(10) Patent No.: US 7,406,499 B2
(45) Date of Patent: Jul. 29, 2008

(54) ARCHITECTURE FOR PARTITION COMPUTATION AND PROPAGATION OF CHANGES IN DATA REPLICATION

(75) Inventors: Ram P. Singh, Sammamish, WA (US); Charumathy Narayanan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 10/434,647

(22) Filed: May 9, 2003

(65) Prior Publication Data

US 2005/0015436 A1 Jan. 20, 2005

(51) Int. Cl.
*G06F 15/16* (2006.01)
*G06F 12/00* (2006.01)

(52) U.S. Cl. .......................... 709/205; 707/201; 707/3
(58) Field of Classification Search ................ 709/248, 709/203–207, 213–214; 707/201, 8
See application file for complete search history.

(56) References Cited

U.S. PATENT DOCUMENTS

| | | | |
|---|---|---|---|
| 5,737,601 A | 4/1998 | Jain et al. | |
| 5,758,355 A * | 5/1998 | Buchanan | 707/201 |
| 5,999,947 A * | 12/1999 | Zollinger et al. | 707/203 |
| 6,047,289 A | 4/2000 | Thorne et al. | |
| 6,094,715 A | 7/2000 | Wilkinson et al. | |
| 6,199,100 B1 | 3/2001 | Filepp et al. | |
| 6,321,236 B1 * | 11/2001 | Zollinger et al. | 707/203 |
| 6,466,950 B1 * | 10/2002 | Ono | 707/201 |
| 7,200,668 B2 * | 4/2007 | Mak et al. | 709/230 |
| 2002/0174103 A1 | 11/2002 | Hsiao | |
| 2004/0054763 A1 * | 3/2004 | Teh et al. | 709/221 |
| 2004/0199550 A1 * | 10/2004 | Ito et al. | 707/201 |

FOREIGN PATENT DOCUMENTS

WO 03038681 A 5/2003

OTHER PUBLICATIONS

D.B. Skillicorn, "Parallelism and the Bird-Meertens Formalism", Apr. 24, 1992, 16 pages.
Mejdi Eraslan, Nicolas D. Georganas, Jose R. Gallardo and Dimitrios Makrakis, "A Scalable Network Architecture for Distributed Virtual Environments with Dynamic QoS over IPv6", Jun. 2003, 16 pages.
European Search Report dated Jul. 4, 2007 for European Patent Application Serial No. EP 04 00 8233, 1 Page.

* cited by examiner

*Primary Examiner*—Glenton B. Burgess
*Assistant Examiner*—Brendan Y Higa
(74) *Attorney, Agent, or Firm*—Amin, Turocy & Calvin, LLP

(57) ABSTRACT

The present invention provides for facilitating synchronization in a data source/data destination environment using data replicas. When a plurality of destinations request synchronization with a source, a first destination selected for synchronization is processed such that differences between the first destination data and source data is determined and persisted in a partition update. After updating the first destination, the synchronization process continues only for those remaining destinations that will be affected by the partition change, as determined by the persisted data, and then as updated by the persisted data.

45 Claims, 7 Drawing Sheets

ARCHITECTURE FOR PARTITION COMPUTATION AND PROPAGATION OF CHANGES IN DATA REPLICATION

TECHNICAL FIELD

This invention is related to network data architectures, and more specifically, to updating such network-based data across disparate systems.

BACKGROUND OF THE INVENTION

The advent of global communication networks such as the Internet has facilitated widespread dissemination of information through corporate enterprise(s) in the form of disparate databases typically utilized by separate corporate entities or branch-offices at various geographic locations. Merging such heterogeneous data sources into a homogeneous database heretofore poses a significant system-intensive process that results in duplication of many system processes.

Disparate databases can be converged by means of replication—replication is a process that copies and distributes data and database objects from one database to another, and then synchronizes information between the databases for consistency.

Merge replication is a difficult replication type. Merge replication capability enables disconnected and mobile users to run applications offline, and then periodically reconnect to synchronize with a main database. It makes possible autonomous changes to replicated data on a source (also called a publisher) and on a destination (also called a subscriber) while connected or disconnected, and then merging the updates between sites when the sites are connected. With merge replication, a server captures incremental data changes in the source database and in the destination database, and reconciles conflicts according to preconfigured rules or via employing a custom resolver to resolve the conflicts.

Merge replication is typically used in support of autonomous changes of replicated data at the source and/or destination. The data is synchronized between servers either at a scheduled time or on demand. Updates are made independently (e.g., no commit protocol) at more than one server; so same data can be updated by the source or by more than one destination. Consequently, conflicts can occur when data modifications are merged. Merge replication includes default and custom choices for conflict resolution that can be defined when a merge source is configured. When a conflict occurs, a merge agent invokes the conflict resolver to determine which data will be accepted and propagated to other destination sites. Options available with merge replication include filtering source data horizontally and vertically, including employment of join filters and dynamic filters, using alternate synchronization partners, optimizing synchronization to improve merge performance, validating replicated data to ensure synchronization, and utilizing attachable subscription databases.

Merge replication supports horizontal, dynamic, and join filtering, all of which enable an administrator to create partitions (or tables) of data to be replicated. Filtering of replicated data allows for at least the following: a minimization of the amount of data sent over a network; reduction in the amount of storage space required at a destination replica; customization of data sources and applications based upon individual destination replica requirements; and avoidance or mitigation of conflicts because the respective data partitions can be sent to different destination replicas. Even though merge replication allows multiple replicas to update the same data, filtering of the data such that replicas receive disjoint sets, ensures that no two replicas to a single destination will be updating the same data values.

Traditionally, merge replication has supported techniques to keep a partition of a source replica consistent with a destination replica. However, existing algorithms introduce significant performance degradation of a system by requiring concurrent synchronization sessions between the source and destination replicas. In conventional servers, merge replication has had to support very sophisticated partitioning techniques to allow destination replicas to receive only a subset of the data of the source replica. These techniques require a high number of CPU cycles at the source replica, and thus create a bottleneck for expanding a network by increasing the number of simultaneous synchronizations required for maintaining destination database replication. Intensive hardware and software processor functions are associated with "partition computation" algorithms that prepare a list of changes needed to keep the partition of the destination replica consistent with that of the source replica.

Under a conventional partition computation approach, when a client requests database synchronization with a server, the partition computation function of the server includes computing the partition membership of rows that have not been synchronized in order to determine differences between the two databases. Since the client database is typically a subset of an overall database residing on the server, the computation function further includes reviewing substantially all current changes at the source replica that may potentially need to be propagated to the destination replica, and then determine which of those changes are relevant to the destination replica. For instance, rows that qualify according to the destination replica filter criteria belong to the destination replica and must be updated or inserted at the destination replica. Rows that have undergone updating and no longer satisfy the filer criteria, no longer belong to the destination replica and hence, must be deleted. This implies that an update at the source replica could be propagated as a delete operation to the destination replica. Further, rows that have undergone updating and now belong to the destination replica may need to be expanded, if there are join filters, to obtain the related rows from the joined tables.

Some negative aspects from a performance and scaling point of view of the "per synchronization session partition computation" approach are as follows. Conventional systems are burdened with redundant processing, since for every change, irrespective of whether there is partition update or not, a conventional synchronization session needs to evaluate whether the changed row belongs to the destination replica or not. If a row changes before each synchronization session, every subsequent synchronization session evaluates again, whether that row belongs to the destination replica, by establishing new partition membership metadata for that row. The knowledge about a row's previous partition membership is not remembered between synchronization sessions. This leads to redundant processing for each synchronization session. To illustrate the process intensive aspects of the conventional system by example, consider a network with one thousand destination replicas. If a row is determined by the source to have undergone a change and requires publication to the destinations, the one thousand destination replicas synchronize to be more up-to-date. If the row changes again, another one thousand synchronization sessions follow, and this process is repeated until the row has changed one thousand times. In the end, all of the synchronization sessions will have executed a combined total of one million partition computation functions for the same row.

Conventional systems exhibit poor concurrency behavior; since for every row change, each destination replica is required to perform its own evaluation. In the presence of multiple simultaneous synchronizations between the source and destination systems, there will be multiple instances of the partition computation executing simultaneously, causing high CPU consumption in the source server.

The partition computation algorithm that prepares the list of changes needed to keep the partition of the destination replica consistent with that of the source replica tends to be the most CPU and query processor intensive functions that are executed in any given synchronization session. If the filtering used to define the set of replicated data were not optimal, the performance of concurrent partition computation functions would further degrade the capabilities of the source server.

Faster hardware and more efficient replication configuration can address this issue to a certain degree. But even in a perfectly designed and tuned application, every Publisher server has an upper limit with respect to the number of simultaneous Subscriber merge processes it can handle effectively.

One solution to this problem is to coordinate the timing of the source merge processes so that the processes are staggered. If all destinations currently connect at the beginning or end of their work day to merge changes, merge processes can be required to be performed at off-peak times during the day. If there is no control over when destinations perform merge processes, an upper limit can be defined to limit the number of destination that are allowed to merge at the same time.

Another way to reduce the demands on a source server is to spread processing load across more sources. A common technique is to use several servers in a republishing hierarchy. For example, if a single server currently acts as a source for all sales representatives in the country, two more source servers could be added to distribute the load associated therewith, wherein a Central Publisher publishes data to East and West Subscribers, an East Subscriber republishes data to the sales representatives on the East coast, and a West Subscriber republishes data to the sales representatives on the West coast.

However, none of the conventional solutions provide a cost effective and efficient architecture for addressing the problem associated with a large number of synchronizations. Conventional systems propagate irrelevant metadata over the network. Since there is no persisted membership metadata even after synchronization sessions have computed partitions, all changes at the source replica will be considered relevant for propagation to the destination replica. This approach contributes to the scaling problem, since the list of changes to be considered grows if a large number of destination replicas propagate changes to the source replica. Moreover, if the source replica records any additional metadata during one synchronization session with a destination replica, there might be a need to propagate this metadata to other destination replicas. Hence, the scaling characteristics of the current approach are less than desirable. There is a need in the art to minimize the amount of metadata that is considered and propagated over the network during the synchronization session. Based upon deficiencies in the prior art to support many concurrent synchronizations sessions, there is a need to eliminate expensive partition computation functions during the execution of every synchronization session.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides novel architecture for partition computation and allows the number of concurrent synchronization sessions to be scaled up significantly via merge replication to support deployments that require a large number of concurrent synchronization sessions. In accordance with one aspect of the present invention, a new algorithm is introduced for keeping the partition of data at the destination consistent with that of the source. When changes occur, the architecture operates such that the partition membership of these changes is computed by using a simple set of queries. The pre-computation of partition membership of a first synchronization allows efficient propagation of changes between the source replica and subsequent synchronization sessions of destination replica.

A salient aspect of the present invention is that instead of computing partition membership of rows on the fly during every synchronization session between the source replica and a destination replica, the penalty of calculating the partition membership is incurred at the actual time of the row modification. This approach then allows the elimination of partition computations during every synchronization session, since the partition information is pre-computed at the time of the first session update and persisted for subsequent synchronization sessions.

Accordingly, the present invention disclosed and claimed herein, in one aspect thereof, comprises architecture for facilitating synchronization in a client/server environment using data replicas. When a plurality of clients request synchronization with the server, the first client selected for synchronization is processed such that the partition membership rows in the database is computed and recorded using persisted metadata. After updating the first client, the synchronization process continues only for those remaining clients that will be affected by the update, as determined by the persisted metadata.

The novel aspects of the present invention allow for processing to be performed (similar to the "per synchronization session partition computation") only when a row is changed for the first time, but thereafter, persists the partition membership information. Contrary to the disclosed architecture, conventional architectures "forget" the membership information, and thus require computation of this information for each synchronization session. In accordance with aspects of the present invention, during subsequent synchronization sessions, the changes at the source replica are propagated to a destination replica using the persisted membership information to evaluate whether a change is relevant to a remaining destination. Moreover, if the same row is changed multiple times, though without updating involved (which is probably the most common scenario for updates), then partition computation is not even performed after the first time. This is because the persisted membership information is valid until there is an update, and so even the subsequent synchronizations can still use the same persisted membership information.

When the row undergoes updating at the destination, the membership information for that row is updated. Further, rows that have undergone updating and now belong to the destination replica may need to be expanded, if there are join filters, to get the related rows from the joined tables. An important aspect of the computation is that it is performed using simple set-based queries. The performance of this set-based query scales very well even if there are numerous partitions, as long as each changed row only belongs to a small subset of all partitions, or in the best case, of well-partitioned data to exactly one partition.

The persisted membership information for a changed row is essentially a mapping between a row identifier of the changed row to the partition identity of the destination replicas that qualify to receive the row. Inserts and updates need re-evaluation of partition membership, and also need to perform a process called expansion to get the related rows. That is, expansion addresses those child rows whose partition membership has changed because the parent row has been updated, and must have their partition identifiers reevaluated.

With respect to deletes and updates, the information about past memberships would have to be persisted, so that during the next synchronization (synch) session, there is an easy way to know whether those rows need to be deleted from the destination replica.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Definitions

Figure 1:
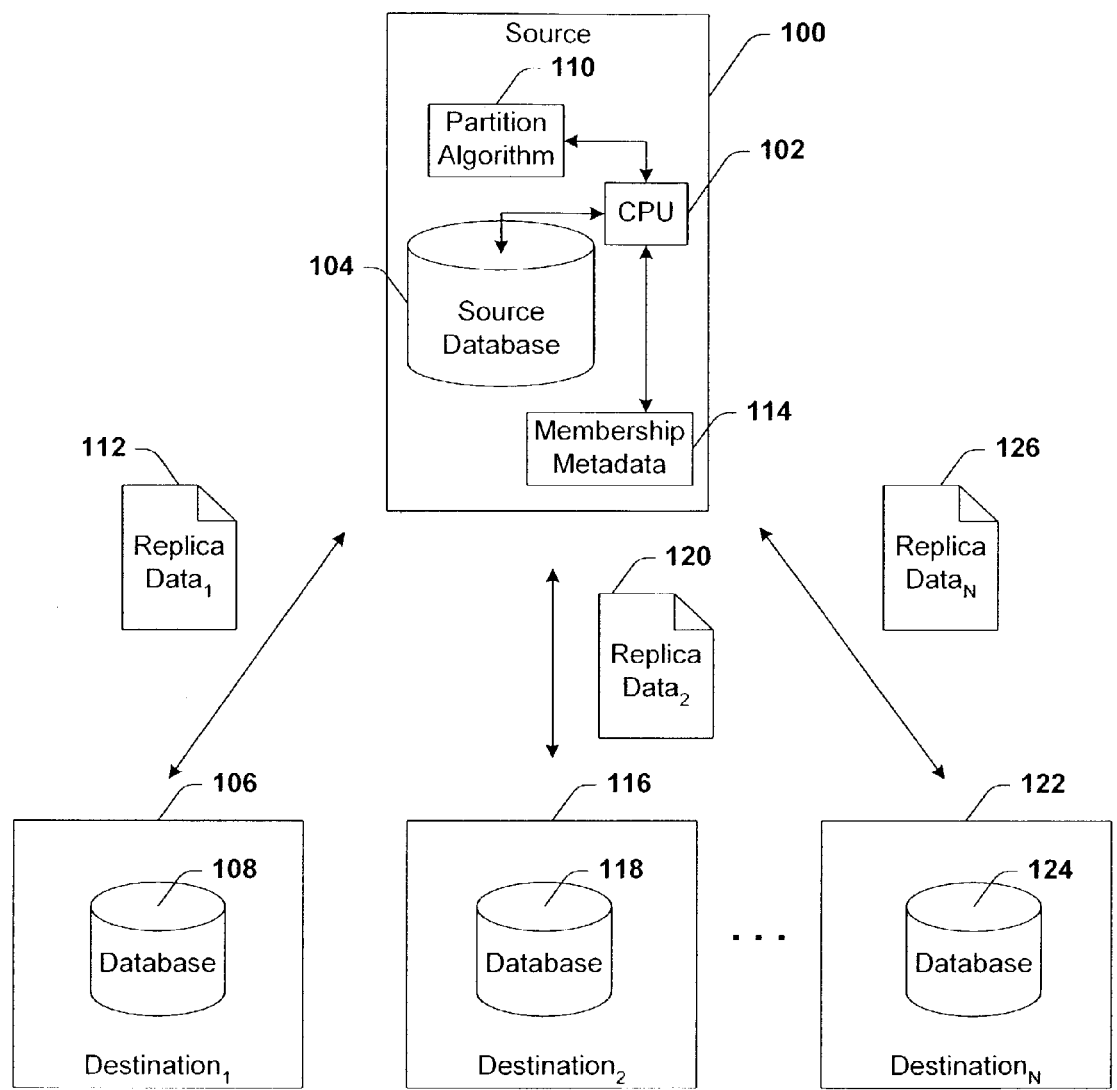
FIG. 1 illustrates a system block diagram of the present invention.

The following terms are used throughout the description, the definitions of which are provided herein to assist in understanding various aspects of the subject invention.

Source replica: A data set from which changes originate.

Destination replica: A data set to which changes are propagated.

Partial replica: A data set published from the source to the destination that comprises a subset of the data of the source replica.

Partition: A subset of data, and all replicas that receive the same subset of data are considered to be in the same partition and can be assigned the same partition identifier.

Partition realignment: Modifications that cause the partition membership of rows in a destination replica to change. For instance, if the membership of rows in a partition replica is predicated using a WHERE clause, then any row modification that updates a column to a different value constitutes a partition realignment. For example, if a filter "where state='WA'" is used on a table Customers, then a change in the value of the "state" column in a row causes a partition realignment of the row.

Before values: Values of the data before the update operation.

After values: Values of the data after the update operation.

Row filters: Filters that allow a subset of rows from a table to be published from the source to the destination. Row filters use the WHERE clause of a query and restrict the rows included in a partition based on specific criteria.

Join filters: Filters that allow cross-table relationships to be used in the definition of replication filters when the filter of one table is based on another table in the publication. The join filter defines a relationship between two tables that will be enforced during the synchronization session; it is similar to specifying a join between two tables. The join filter names two tables, and specifies the join condition to represent the relationship between the two tables. The join condition is usually of the form TABLE1.COLUMN1=TABLE2.COLUMN2.

Dynamic filters: Row filters that use a function to retrieve a value from the destination replica, and then filter data based on that value. The filter is defined once, but the qualifying resultant set can be different for each destination replica and allows the destination replica to receive only the subset of data customized for its needs.

Synchronization: A process that converges the data sets from the source and destination replicas into a final convergent state.

Synchronization anchor: An entity that determines how out-of-sync two replicas are. This is usually modeled as a "logical clock entity" which depicts the time the last two replicas were synchronized.

Conflict detection: A process that occurs during synchronization that enquires metadata at the source replica and destination replica to determine if the modifications are in conflict.

Conflict resolution: A process that occurs during synchronization that determines winner and loser of a conflict, once the conflict occurs.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a system block diagram of the present invention. The following discussion begins from a point in the system operation where a source and multiple destinations had previously synchronized. Each of the destinations has made changes to their respective databases and now reestablishes communication with the source to request synchronization of the databases.

A server (or source) 100 receives a synchronization request from a plurality of N clients (or destinations). The source 100 includes a central processing unit (CPU) 102 for processing the synchronization request and controlling all source system operations. The CPU 102 interfaces to a source (or master) database 104 for storing all of the database entries utilized by the plurality of destinations. Thus the source database 104, also called a source replica, contains substantially all information that potentially needs to be published to the N destinations.

After receiving multiple synchronization requests from the N destinations, a first destination 106 will be selected by the source 100 for synchronization. The first destination 106 includes a first destination database 108 that stores all database entries related to that destination 106, including the most recent changes made after the last synchronization. Thus there is data stored on the first destination database 108 that is different from the data of the master database 104 of the source 100.

After selection of the first destination 106, the source 100 determines the set of database updates that have been performed after the previous synchronization session with the destination database 108 to ascertain the data differences (or changes) between the source database 104 and destination database 108. The source 100 includes a partition computation algorithm 110 that generates a partition of the changed data, which partition defines only those changes relevant to the first destination 106. This partition is persisted at the source 100 as membership metadata 114, and indicates those row entries of the destination database 108 that were changed after the previous synchronization process. The membership metadata 114 is stored at the source 100 for utilization with subsequent synchronization sessions of the remaining destinations 2 . . . N.

After the first destination has been synchronized with the source 100 by a first replica data 112 synchronization of the first destination 106 is complete.

The updated database information of the first destination 106 now needs to be propagated by merge replication to some or all of the 2 . . . N destinations that are awaiting synchronization. In accordance with one aspect of the present invention, subsequent destination synchronizations do not need to perform all calculation operations performed during synchronization of the first destination 106, but benefit from the membership metadata 114 persisted by the first synchronization. Thus the membership metadata 114 is utilized to generate replicas for download to the 2 . . . N destinations. This introduces an enormous savings in processing time at the source 100 over conventional architectures, since conventional architectures require recomputing the partition membership for all subsequent synchronizations. More significantly, the expensive partition computation cost is amortized over numerous synchronization sessions since it is executed at the time of the actual update as opposed to during synchronization. This technique scales better under heavy loads when numerous synchronization sessions are running concurrently against the source replica.

In operation, a second destination 116 with a second destination database 118 is selected by the source 100 for synchronization. The source 100 obtains filter criteria associated with the second destination 116, and determines exactly which changes are relevant for propagation to the second destination 116 based on the partition membership of the second destination 116.

The synchronization process continues for the remaining N destinations, such that the source 100 utilizes the membership metadata 114 for synchronization with an Nth destination 122 having an Nth destination database 124. The filter criteria for the Nth destination 122 is obtained, analyzed, and applied against the membership metadata 114 for generating sets of changes 126 for download to the Nth destination 122, if required. When the synchronization metadata that is persisted at a given replica is determined safe for cleanup (e.g., based on a retention based policy, i.e., replicas that do not synchronize within a given duration are disallowed from subsequent synchronization), the corresponding partition membership metadata is also determined to be safe for cleanup.

Note that while the description is provided in the context of a client/server environment, the present invention has application to any homogenous data collections that require synchronization. Similarly, the present invention has application in peer-to-peer computing environments. For example, where there are at least two destination data collections requiring synchronization with a source data collection, the data collections can be synchronized in accordance with the novel aspects described herein.

Figure 2:
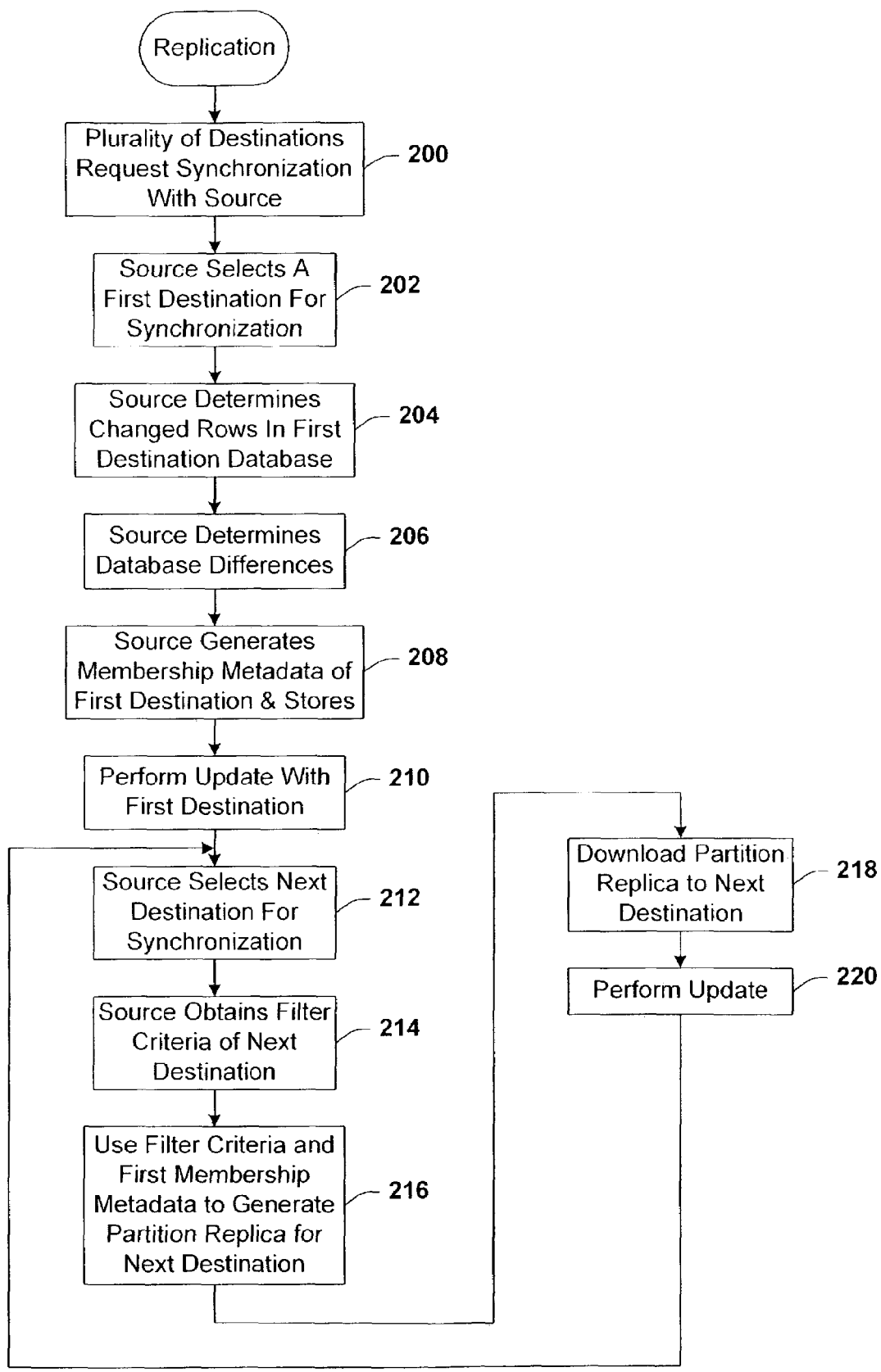
FIG. 2 illustrates a flow chart of a replication process of the present invention.

Referring now to FIG. 2, there is illustrated a flow chart of a replication process of the present invention. While, for purposes of simplicity of explanation, the methodology may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a plurality of destinations 1 . . . N request synchronization with a source. At 202, the source selects a first destination for synchronization. The selection process can be determined in a number of ways, including but not limited to, the destination that first requests synchronization, and utilizing a priority scheme of the destinations that are requesting synch-up. Once the first destination is selected, the source determines the set of changes rows in the first destination database to establish the current state thereof, as indicated at 204. At 206, the source determines differences between the source database and the first destination database utilizing the partition computation algorithm for examination in order to determine what changes will be propagated to selected destinations of the remaining 2 . . . N destinations. At 208, the partition computation algorithm creates first membership metadata in the form of one or more metadata tables, and stores the membership metadata at the source. At 210, a first partition replica is downloaded to the first destination for updating. Once updating is completed, synchronization of the first destination is complete.

At 212, the source selects a next destination for synchronization. At 214, filter criteria of the next destination are then obtained by the source to determine if synchronization is even required for the next destination for this particular set of data of the first destination. If so, at 216, the source utilizes both the filter criteria and the first membership metadata to create a second partition replica for the next destination (or second destination). At 218, the second partition replica is downloaded, and at 220, partition updating is performed to complete this portion of the synchronization process for the next destination. The process cycles back to the input at 212 to select a next destination for synchronization.

The process continues until all of the destinations requesting synchronization have received the changed information of the first destination, after which, synchronization continues for the changed data of second destination across all other destinations, and so on, up to N destinations.

Figure 3:
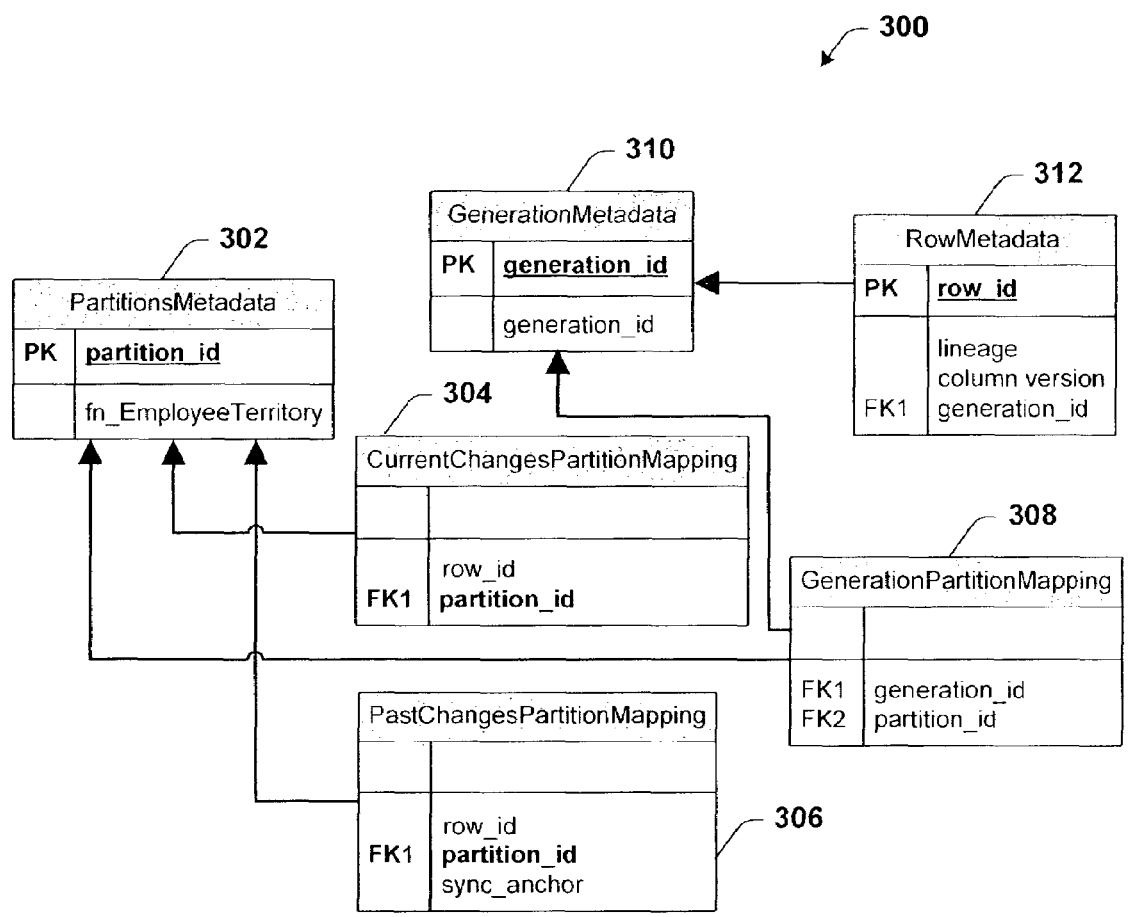
FIG. 3 illustrates the interrelationships of the metadata tables utilized by the computation algorithm for computing the membership metadata of a destination.

Referring now to FIG. 3, there is illustrated interrelationships of metadata tables 300 utilized by a computation component for computing membership metadata of a destination. There are principally six tables utilized to capture change information of a destination database. A partitions metadata table 302 (denoted PartitionsMetadata) is mapped to by three other tables: a current changes metadata table 304 (denoted CurrentChangesPartitionMapping), a past changes metadata table 306 (denoted PastChangesPartitionMapping), and a generation partition metadata table 308 (denoted GenerationPartitionMapping). The GenerationPartitionMapping table 308 maps to a generation metadata table 310 (denoted GenerationMetadata), which table 310 is also mapped to by a row metadata table 312 (denoted RowMetadata). It is to be appreciated that any suitable number of tables and/or metadata may be employed in accordance with the particular implementation.

Three pieces of metadata that are utilized to compute partition membership of a row at a replica include: distinct partitions (using the PartitionsMetadata table 302) that identify the partition of the destination replica; current partition membership of the row (using the CurrentChangesPartitionMapping table 304); and, past partition membership of the row (using the PastChangesPartitionMapping table 306). The current and past membership information allows for the efficient propagation of partition updates to other destination replicas. It is preferable to keep knowledge about the partitions to which the row previously belonged, as this allows propagation of "deletes." A delete is that data (or row) that is no longer required in the destination replica.

The PartitionsMetadata table 302 keeps track of interesting evaluations of the filter functions. If a destination replica synchronizes with the source replica, and the distinct partition identifying the destination replica is not present in the partitions table 302, then a new entry with the "partition value" is created and assigned a new partition_id parameter. As new destinations are selected for synchronization for the first time, an entry for each is registered in the PartitionsMetadata table 302 with respective partition values, and is assigned a new partition_id.

If a dynamic filter expression for Employees is "where TerritoryID=fn_EmployeeTerritory( ), then a column called fn_EmployeeTerritory is added to the PartitionsMetadata table 302. When changes are made to Employees rows, all partitions to which the changed rows belong are computed using a single set-based query that joins Employees with the PartitionsMetadata table 302 using the filter expression as the join clause with fn_EmployeeTerritory( ) replaced by PartitionsMetadata.fn_EmployeeTerritory.

The performance of this set-based query scales very well even if there are numerous registered partition_id's, as long as each changed row only belongs to a small subset of all partition_id's, or in the best case, of well-partitioned data to exactly one partition_id.

The CurrentChangesParititionMapping table 304 keeps track of the current mapping of a given row to its relevant partition. Thus the table 304 includes the partition_id column in this table, which is a value that is derived from the PartitionsMetadata table 302. A row_id column of the CurrentChangesPartitionMapping table 304 contains the unique identifier of the given row that is used by replication.

The PastChangesPartitionMapping table 306 keeps track of any past mappings of a given row to any partitions to which it might have belonged. Thus the table 306 includes a partition_id column that is a value derived from the partitions table 302. A row_id column of the table 306 contains the unique identifier of the given row that is used by replication. A synchronization anchor column (synch_anchor) column logically contains information as to when the partition mapping of a row was changed. Capturing the synchronization anchor during the partition update allows the synchronization process to propagate the partition updates from the source 100 to only those destinations that have not received these changes since the last time the source and destination were synchronized. In the sample data, the sync_anchor column will utilize values in the format of UTC time (Universal Time Coordinate) or Greenwich Mean Time value, for simplicity.

The generation partition table 308 includes a generation_id column that is the synchronization anchor assigned to a group of changes. When changes are propagated from a destination to the source 100, the changes are assigned a new generation_id at the source 100. Since the rows that are part of this generation belong to a distinct partition P1, the GenerationPartitionMapping table 308 includes a partition_id column for mapping to the destination's partition_id P1. Note, however, that in general, a generation could be mapped to more than one partition identifier. This is different from the generations that have a special value of "-1" for the partition_id. When a different destination replica belonging to another distinct partition P2 synchronizes with the source 100, the generation mapping eliminates P1 generations. A special value of minus one for the partition_id indicates that the generation is global, and hence, is relevant to all partitions.

The generation table 310 includes a generation_id column for assigning a unique generation ID to each generation. The generation partition table 308 includes the generation_id that maps this table 310, and tracks which generations have been propagated to the current replica and which generations represent local changes. It allows the synchronization process to derive a list of relevant generations that need to be considered for a given session.

The RowMetadata table 312 tracks replication metadata on a row-by-row basis, and contains information about when a row was changed by using a logical clock to represent time. The table 312 also contains information on what replicas contributed to this version of the row, along with information on current versions for the columns. Both the generation partition table 308 and the RowMetadata table 312 map to the generation table 310.

Following is Table 1 that summarizes the different metadata tables and respective functions.

TABLE 1

Metadata Tables and Summaries

| Metadata Table Name | Purpose |
| --- | --- |
| RowMetadata | Tracks replication metadata on a row-by-row basis; and contains information about when a row was changed (using a logical clock to represent time) and also row and column version vectors. |

TABLE 1-continued

Metadata Tables and Summaries

| Metadata Table Name | Purpose |
|---|---|
| GenerationMetadata | Tracks which generations have been propagated to the current replica and which generations represent local changes; allows the synchronization process to derive a list of relevant generations that need to be considered for that given session. |
| PartitionsMetadata | Contains a distinct entry for every partition value that represents the destination replicas. |
| GenerationPartitionMapping | Contains mapping information as to which of the generations in the GenerationMetadata table are relevant to which partitions. |
| CurrentChangesPartitionMapping | Contains metadata as to which changes are currently relevant to which partition. |
| PastChangesPartitionMapping | Contains metadata as to which changes were previously relevant to which partition. |

Partitioning of Generations for Efficient Propagation of Changes

A novel aspect of the present invention also facilitates an optimization that is employed during propagation of changes. Merge replication currently uses the concept of "generations" to logically group changes that are propagated from the source to the destination replica. The GenerationMetadata table 310 tracks which generations have been propagated to the current replica and which generations represent local changes. Generation partitioning also allows the synchronization process to derive a list of relevant generations that need to be considered for a given session.

When changes are made at a source replica, the source assigns a generation value to a set of changes on the table, which generation value is a logical clock entity. The grouping concept allows destination replicas to efficiently identify if the group of changes has been received from a previous synchronization session that might have been interrupted, or via a synchronization session with a different source replica. In essence, the list of generations values that are currently absent at a destination replica reflect the changes that are relevant to be considered for propagation from the source to the destination. If the destination replica receives a subset of data from the source replica, e.g., a destination replica, then changes that meet the replica's partition criteria are the only changes that are propagated to the destination.

However, current versions of merge replication still need to propagate information about all generations present at the source replica to the destination replica irrespective of whether these generations contain changes that are relevant or not relevant to the destination replica. This is due to there being no metadata that track if the changes that are part of the generations at the source replica are relevant or irrelevant to the partition of interest.

Partition groups that identify the partition membership of rows allow efficiencies in the propagation of generations from source to the destination replica. Since sets of changes already map to partition identifiers, the generation that is a grouping of rows can also be mapped to partition identifiers. Thus when a destination replica is interested in specific partitions available at the source replica, generation values that contain changes in partitions irrelevant for the destination replica can quickly be eliminated in computing the set of relevant changes. In addition to offering computation efficiency, this algorithm also has better network performance characteristics, since only generations that are relevant to a destination partition are propagated over the network.

Figure 4:
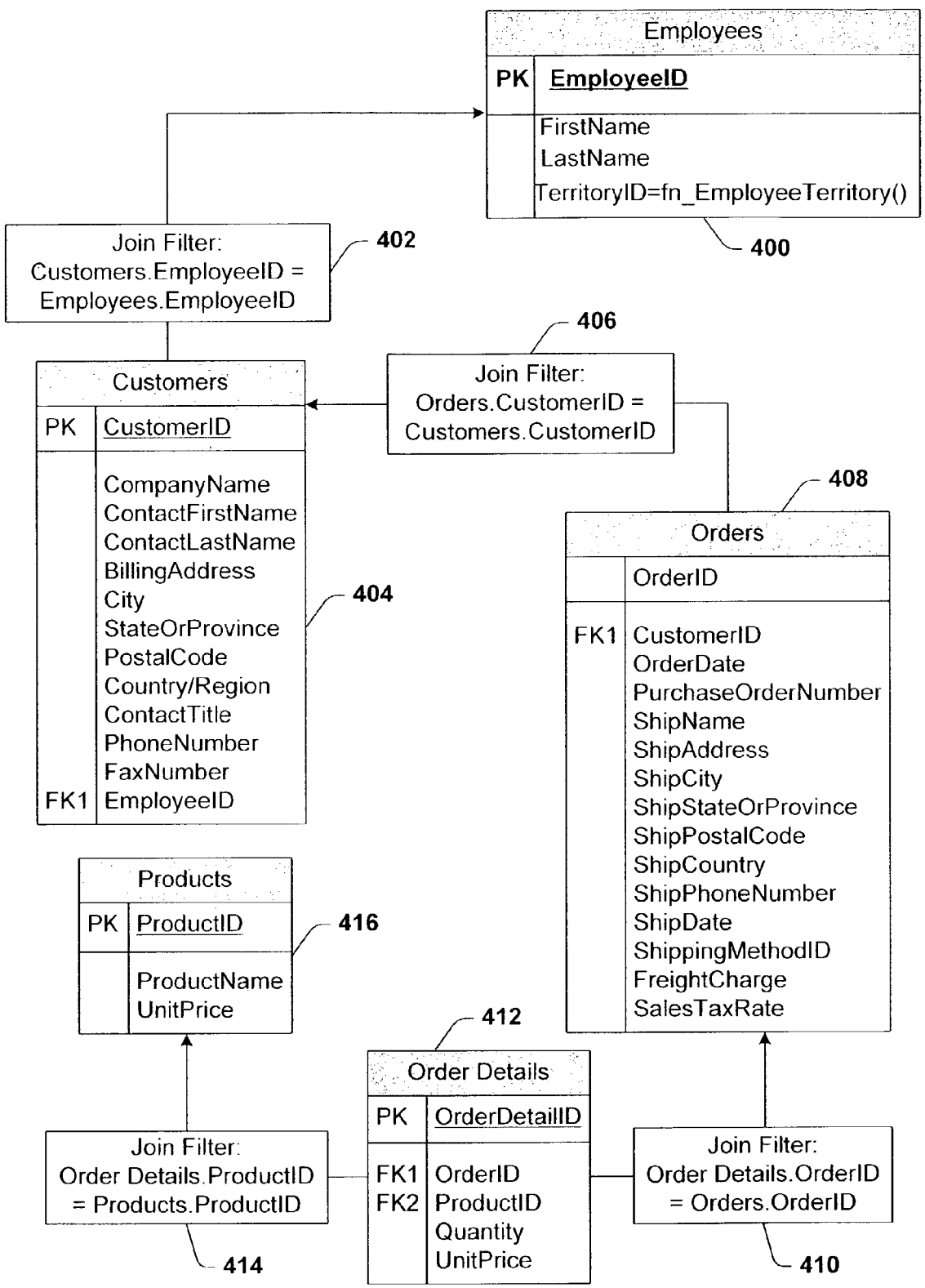
FIG. 4 illustrates a sample update schema a sample update schema that utilizes filtering and expansion.

Referring now to FIG. 4, there is illustrated a sample update schema that utilizes filtering and expansion. The example is premised on an employee being relocated. The update process includes reassigning customer data of the relocated employee to anther employee. In this example, the client information includes at least the customer information, customer order information and customer order details. The partitions table is the Employees partition table 400 that uniquely identifies the relocating employee with an EmployeeID parameter. In this example, the table 400 includes at least three columns: a FirstName column, a LastName column, and a TerritoryID column. If the dynamic join filter expression for the Employees partition is "where TerritoryID=fn_EmployeeTerritory( )", then a column called fn_EmployeeTerritory is added to the Employees partitions metadata table 400.

As new partitions arrive to synchronize for the first time, the new partitions register an entry in this table 400 with their respective partition values and are assigned a new partition_id. When changes are made to rows of the Employees table 400, all partitions to which the changed rows belong are computed using a single set-based query that joins employees with the Employees partitions metadata table 400 using the filter expression as the join clause. The function invocation fn_EmployeeTerritory( )is then replaced by PartitionsMetadata.fn_EmployeeTerritory.

For example, if the TerritoryID column in the Employees partitions table 400 is evaluated to fifty-one distinct geographic areas in United States, the Employees partition table 400 will assign a unique partition identity to each of these fifty-one distinct values. If a destination synchronizes with the source 100 and the distinct partition identifying the destination replica is not present in the Employees table 400, then a new entry is created with the distinct "partition value", and assigned a new partition_id.

The following table (Table 2) is a sample Employees PartitionsMetadata table 400 without columns of employee first and last names. The last column provides an interpretation of the sample data, but is not necessarily part of the schema.

TABLE 2

Sample PartitionsMetadata Table

| Partition_id | fn_EmployeeTerritory | Interpretation of table (not part of the schema) |
|---|---|---|
| 1 | "WA" | Partition ID = 1 corresponds to the Washington territory. |
| 2 | "CA" | Partition ID = 2 corresponds to the California Territory. |
| 3 | "OR" | Partition ID = 3 corresponds to the Oregon territory. |
| ... | ... | ... |

The performance of this set-based query scales very well even if there are numerous registered partition_id's, as long as each changed row only belongs to a small subset of all partition_id's, or in the best case, of well-partitioned data to exactly one partition_id.

As indicated above, all of the client information needs to be propagated along with the employee. Join filters are employed to facilitate this process by defining cross table relationships that will be used during the synchronization process. In the sample schema the partition membership of rows in the Employees table 400 is predicated using the "row filter" definition on the Employees table 400. The partition membership of rows in the Customers table 404 is based on the membership of rows in the Employees table 400 predicated using the join filter definition 402 between these Employees and Customers. The membership of rows in the Orders table 408 is based on the membership of rows in the Customers table 404 predicated using the join filter definition between Customers and Orders. Similarly, the membership of rows in the Order Details table 412 is based on the membership of rows in the Orders table 408 predicated using the join filter definition between these Orders and Order Details.

Thus a first join filter 402 defines a cross table relationship (Customers.EmployeeID=Employees.EmployeeID) between the Employees table 400 and a Customers table 404. The Customers table 404 is associated with a CustomerID that uniquely identifies the customer, and includes at least an EmployeeID column that maps to the Employees table 400, and other columns related to customer account information such as name, address, zip codes and, contact numbers and information. A second join filter 406 defines a table relationship (Orders.CustomerID=Customers.CustomerID) between the Customers table 404 and an Orders table 408. The Orders table 408 is associated with an OrderID that uniquely identifies the order information with the Customer table 404, and includes at least a CustomerID column that maps to the Customers table 404. The table 408 includes other columns of information related to the customer order, such as shipping information, tax rates, and freight charges.

A third join filter 410 defines a table relationship (OrderDetails.OrderID=Orders.OrderID) between the Orders table 408 and an Orders Detail table 412. The Order Details table 412 is associated with an OrderDetailID that uniquely identifies the order details information with the Orders table 408, and includes at least an OrderID column that maps to the Orders table 408. The table 412 includes a ProductID column that maps the Order Details table 412 to a Products table 416. The table 412 also includes a Quantity column and a UnitPrice that provide information about the products ordered. Thus the Order Details table 412 requires the UnitPrice information from the Products table 416.

A fourth join filter 416 defines a table relationship (OrderDetails.ProductID=Products.ProductID) between the Order Details table 412 and the Products table 416. The Products table 416 is associated with a unique ProductID, and further includes columns for the ProductName and UnitPrice.

Thus the expansion algorithm along with the join filters facilitate propagation with the EmployeeID of all of the information related to the products the client purchased, the order details of the products purchased, the orders that include the details and specific products, and the customer who ordered the products.

Using the sample data depicted below in FIG. 5, this partition update on the Customers table 404 causes the past and current partition mappings for the Customers row to be recomputed. Then, following the join filter 406 between the Customers table 404 and the Orders table 408, all Order rows whose parent partition membership has changed, will have the respective past and current partition mappings reevaluated. Following the join filter 410 between Orders table 408 and the Order Details table 412, all the Order Details rows whose parent partition membership has changed will have their respective past and current partition mappings reevaluated. Finally, following the join filter 414 between the Order Details table 412 and the Products table 416, all the Products rows whose parent partition membership has changed will have their respective past and current partition mappings reevaluated. The algorithm then terminates because the Products table 416 does not have any child rows. When the expansion algorithm terminates, the metadata tables accurately reflect the partition membership of the rows. No further partition computation is required before rows are propagated from the source replica to the destination replica.

To reflect this, the database views that are generated for child tables, reference views that are generated for their immediate parent. In the sample schema, the view on Customers references the view on Employees. Similarly, the view on Orders references the view on Customers. Similarly, the view on Order Details references the view on Orders. The view on the top-level parent, which is the Employees table 400 in this example, uses the PartitionsMetadata table 302 to evaluate the partition membership of the row, further using the value of the filtering column (TerritoryID) in the sample.

For illustration purposes, the following view definitions are used for the sample schema.

View definition for the Employees Table (view_partition_Employees) select [Employees].*, partition_id=[PartitionsMetadata].[partition_id] from Employees, PartitionsMetadata where PartitionsMetadata.fn_EmployeeTerritory=Employees.TerritoryID View definition for the Customers Table (view_partition_Customers) select [Customers].*, partition_id=[Employees].[partition_id] from Customers, [view_partition_Employees] Employees where Customers.EmployeeID=Employees.EmployeeID View definition for the Orders Table (view_partition_Orders) select [Orders].*, partition_id=[Customers].partition_id from [Orders], [view_partition_Customers] [Customers] where (Orders.CustomerID=Customers.CustomerID)

View definition for the Order Details Table (view_partition_OrderDetails) select [Order_Details].*, partition_id=[Orders].partition_id from [Order_Details], [view_partition_Orders] [Orders] where (Order_Details.OrderID=Orders.OrderID)

Partition membership of child rows is determined by selecting the changed set of rows through the views on the set of changed rows. All of the past partition mappings that are computed from "before" values are persisted in the PastChangesPartitionMapping table 306, and all of the current partition mappings are persisted in the CurrentChangesPartitionMapping table 304.

The following table (Table 3) is a sample CurrentChangesPartitionMapping table 304 reflecting the change that as part of the synchronization updates, employee Joe is moved from the CA territory to the WA territory. The last column is for interpretation purposes only, and is not necessarily part of the schema.

TABLE 3

Sample CurrentChangesPartitionMapping Table

| row_id | partition_id | Interpretation of table (not part of the schema) |
|---|---|---|
| R1 | 1 | Row R1 corresponds to Employee "Joe" whose Territory = "WA" |
| R2 | 2 | Row R2 corresponds to Employee "Mary" whose Territory = "CA" |
| R3 | 3 | Row R3 corresponds to Employee "Jane" whose Territory = "OR" |
| ... | ... | ... |

Following is Table 4, a sample PastChangesPartitionMapping table 306 indicating that Joe was previously assigned to the CA territory. The last column provides an interpretation of the sample data, but is not necessarily part of the schema.

TABLE 4

Sample PastChangesPartitionMapping Table

| Row_id | Partition_id | Synchronization anchor | Interpretation of table (not part of the schema) |
|---|---|---|---|
| R1 | 2 | Tuesday, Oct. 08, 2002 10:27 AM | Row R1 corresponds to Employee "Joe" whose Territory used to be "CA" until Tuesday, Oct. 08, 2002 10:27 AM. |
| R2 | 3 | Monday, Oct. 07, 2002 12:25 AM | Row R2 corresponds to Employee "Mary" whose Territory used to be "OR" until Monday, Oct. 07, 2002 12:25 AM |
| ... | ... | ... | ... |

Figure 5:
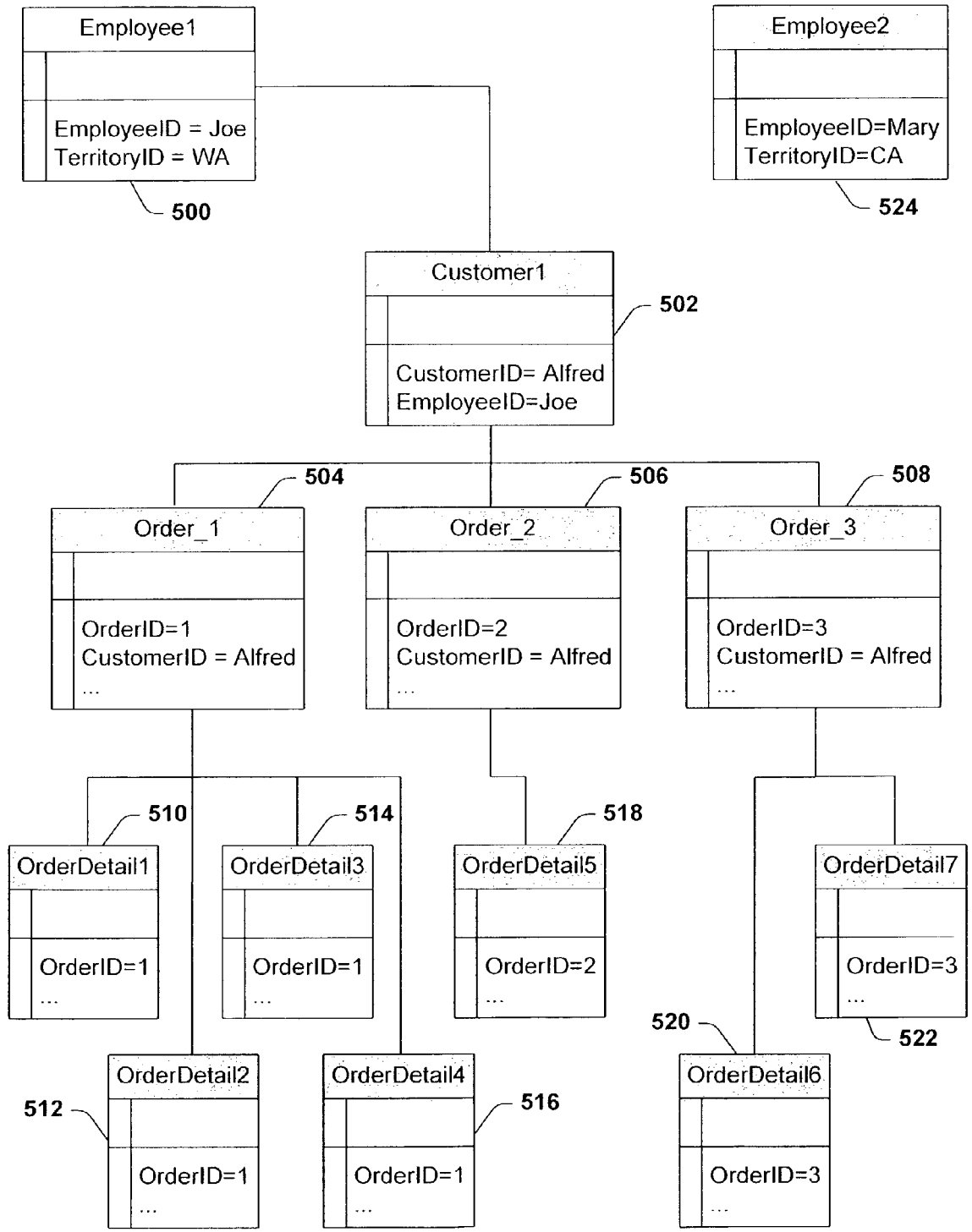
FIG. 5 illustrates an example of a partition update where customer data is being reassigned from one employee to another.

Referring now to FIG. 5, there is illustrated an example partition update where customer data is being reassigned from one employee to another. The existing illustrated table relationships are the following for the EmployeeID of "Joe". An Employee1 table 500 describes an Employee1 row having an EmployeeID column that indicates "Joe", and a TerritoryID column with an entry of "WA" that links the Employee1 table 500 back to the Employees PartitionsMetadata table 400. A Customer1 table 502, as child to the Employee1 table 500, describes a Customer1 row as having a CustomerID column entry of "Alfred", and the EmployeeID entry as "Joe" linking the Customer1 table 502 back to the Employee1 table 500.

The Customer1 table 502 has three child entities; a first Order_1 entity 504, a second Order_2 entity 506, and a third Order_3 entity 508. The Order_1 entity 504 describes the Order_1 row as having an OrderID column with an entry of "1", and a CustomerID column with an entry of "Alfred" to link the entity 504 back to the parent Customer1 table 502. The Order_2 entity 506 describes the Order_2 row as having an OrderID column with an entry of "2", and a CustomerID column with an entry of "Alfred" to link the entity 506 back to the parent Customer1 table 502. The Order_3 entity 508 describes the Order_3 row as having an OrderID column with an entry of "3", and a CustomerID column with an entry of "Alfred" to link the table 508 back to the parent Customer1 table 502.

The first Order_1, entity 504 has four child OrderDetail entities that define order details for that particular OrderID=1. An OrderDetail1 entity 510 describes the row OrderDetail1 as having an OrderID column with an entry of "1" to link the entity 510 back to the parent entity 504, and other column details that are not shown. An OrderDetail2 entity 512 describes the row OrderDetail2 as having an OrderID column with an entry of "1" to link the entity 512 back to the parent entity 504, and other column details that are not shown. An OrderDetail3 entity 514 describes the row OrderDetail3 as having an OrderID column with an entry of "1" to link the entity 514 back to the parent entity 504, and other column details that are not shown. An OrderDetail4 entity 516 describes the row OrderDetail4 as having an OrderID column with an entry of "1" to link the entity 516 back to the parent entity 504, and other column details that are not shown.

The Order_2 entity 506 has one child entity, an OrderDetail5 entity 518, that describes the OrderDetail5 row as having an OrderID column with an entry of "2" to link the entity 518 back to the parent entity 506, and other column details that are not shown.

The Order_3 entity 508 has two child entities, an OrderDetail6 entity 520 and an OrderDetail7 entity 522. The OrderDetail6 entity 520 describes the OrderDetail6 row as having an OrderID column with an entry of "3" to link the entity 520 back to the parent entity 508, and other column details that are not shown. The OrderDetail7 entity 522 describes the OrderDetail7 row as having an OrderID column with an entry of "3" to link the entity 522 back to the parent entity 508, and other column details that are not shown.

The EmployeeID column of the Customer1 row in the Customer1 table 502 is being updated from "Joe" to "Mary". An Employee2 table 524 describes the Employee2 row as having a column with an entry of "Mary" and a TerritoryID column with an entry of "CA". This update has essentially changed the Customer_1 row partition membership from "Joe" to "Mary". Hence the partition membership for the Orders rows, Order_1, Order_2 and Order_3, will also change from "Joe" to "Mary". Similarly the corresponding Order Details rows in the OrderDetails entities 510, 512, 514, 516, 518, 520, and 522 also now belong in a different partition, i.e., "Mary". In order to propagate the partition membership of rows from parent entities to child entities, the expansion process is performed.

Replication Processing-change Tracking and Change Enumeration

Two main phases of replication processing that are affected involve change tracking and change enumeration. When data changes occur in a user database, the change tracking mechanism in the user database keeps track of replication metadata that then allows these changes to be synchronized with other replicas at a later point in time. Change enumeration is a phase of the synchronization process where changes that have occurred in this replica since the previous synchronization between the source and destination replicas are enumerated.

The change reconciliation and change application phases of replication processing are not affected in any significant manner.

The change tracking mechanism will now be described with respect to modifications to the replication metadata when rows are inserted, updated or deleted. When a row is inserted, the current partition membership for the row is evaluated and this information is persisted in the CurrentChangesPartitionMapping table 304. In some rare scenarios where child rows of this given row already exist, then insertion of the new row causes the partition membership of the child rows to also be evaluated using the expansion process.

When a row is updated with a non-filter column update, if there is no metadata for the given row in the metadata tables, the current partition membership for the row is evaluated, and this information is persisted in the CurrentChangesPartitionMapping table 304. The partition membership is not evaluated if the metadata already exists, because that would indicate that the partition membership has already been evaluated before.

When a row is updated with a filtered column update, the partitions the row belonged to in the past are evaluated before the update using the "before" values available during change tracking. Since partition membership of child rows is affected by the partition membership of the parent rows, the expansion process is used to evaluate the past partition mappings for the child rows. All of the past partition mappings are stored in the PastChangesPartitionMapping table 306. Additionally, the logical time at which the partition update occurred is recorded into the synchronization anchor column of the past changes table 306. This allows the synchronization process to dampen propagating of the partition updates to a replica that has already seen this change during a previous synchronization session or via synchronization with a different source replica. Note that evaluating the past partition mappings essentially cleans up any entries in CurrentChangesPartitionMapping table 304, since those entries have been invalidated by the partition update.

When a row is updated with a filtered column update, the partitions that the row currently belongs to are evaluated after the update using the "after" values available during change tracking. Since partition membership of child rows is affected by the partition membership of the parent rows, the expansion process is used to evaluate the current partition mappings for the child rows. All of the current partition mappings are stored in the CurrentChangesPartitionMapping table 304.

When processing a delete, the partitions that the row previously belonged to-before the delete are evaluated using the "before" values available during change tracking. Since the partition membership of child rows is affected by the partition membership of the parent rows, the expansion process is used to evaluate the past partition mappings for the child rows. All the past partition mappings are stored in the PastChangesPartitionMapping table 306. Additionally, the logical time at which the partition update occurred is recorded into the synchronization anchor column of the table 306. This prevents the synchronization process from redundantly propagating the partition updates to a replica that has already seen this change during a previous synchronization session. Since the row and its children do not exist in the partition after the deletion, there is no need to create any entries in the CurrentChangesPartitionMapping table 304. Note that evaluating the past partition mappings essentially cleans up any entries in CurrentChangesParititionMapping table 304, since those entries have been invalidated by the row deletion process.

Updating of partitions requires the change tracking mechanism to update the metadata such that the update is propagated to the destination replicas in an efficient manner. A key aspect is that when the row's partition membership changes, the row's partition_id must be updated, and any child rows whose partition membership has changed because the parent row has been updated, must have their partition-ids reevaluated. This information is captured using the expansion process, which is utilized in the examples provided herein.

The change enumeration mechanism uses the partition membership metadata to efficiently propagate changes from the source replica to the destination replica. Since the change tracking mechanism has already evaluated partitions and preformed expansion, the change enumeration complexity at run-time is greatly simplified.

Deletes and partition updates contribute to the set of changes that have "past partition mapping entries". These set of changes are enumerated by selecting those rows from the PastChangesPartitionMapping table 306 whose synchronization anchor is more recent than the negotiated synchronization anchor for the session, and the partition_id matches the partition_id of the destination replica. These rows will then be propagated as deletes to the destination replica.

Inserts and updates that are partitioned and non-partitioned contribute to the set of changes that have "current partition mapping entries". These set of changes are enumerated by selecting those rows from the RowMetadata table 312 whose synchronization anchor is more recent than the negotiated synchronization anchor for the session, and that have entries in the CurrentChangesPartitionMapping table 304 with partition_id's matching the partition_id of the destination replica. These rows are propagated as updates to the destination replica.

Once the changes for a given partition have been enumerated, the changes are then propagated through the conflict detection and resolution mechanism using existing techniques. Similarly, once the changes for a given partition have been enumerated, and conflicts have been detected and resolved, the changes are then propagated through the change application mechanism using existing techniques.

Generation Partitioning

Mapping of the rows to partitions, as maintained at the source replica, allows for the efficient computation of the list of relevant generations to be propagated between source and destination replicas. For example, the GenerationPartitionMapping table 308 contains the column generation_id, which is the synchronization anchor assigned to a group of generations. When changes are propagated from a destination replica to the source replica, the changes are assigned a new generation_id at the source replica. Since the rows that are part of this generation belong to the distinct partition P1, the generation is mapped to the destination's partition_id P1. When a different destination replica belonging to another distinct partition P2 synchronizes with the source replica, the generation mapping eliminates P1 generations. A special value of minus one for the partition_id indicates that the generation is global, and hence, is relevant to all partitions.

Following is Table 5, a sample GenerationPartitionMapping table 308. The last column provides an interpretation of the sample data, and is not necessarily part of the schema.

TABLE 5

Sample GenerationPartitionMapping table

| generation_id | partition_id | Interpretation of table (not part of the schema) |
|---|---|---|
| G1 | 1 | Generation G1 corresponds to the partition with Territory = "WA" |
| G2 | 2 | Generation G2 corresponds to the partition with Territory = "CA" |
| G3 | −1 | Generation G3 is a global generation and needs to be propagated to all partitions |
| ... | ... | ... |

Partitioning of generations is an optimization that is built on the partition grouping aspect of the present invention, and provides three benefits: the efficient elimination of irrelevant changes; the predictable duration of synchronization sessions, even when many destination replicas have synchronized with the source replica; and enhanced network performance with the propagation of generations.

In a topology where a source replica synchronizes with many destination replicas each with their distinct partition, the generation partitioning allows the synchronization process to efficiently eliminate irrelevant changes. For example, consider a topology where there is one source replica that provides distinct subsets of data to destination replicas, each of which contains sales information specific to one salesperson. If it is assumed that initially, one thousand destination replicas propagate ten thousand changes to the source replica, and that the ten thousand changes are placed into one hundred distinct generations at the source replica, when all one thousand destination replicas have propagated their changes to the source replica, there is a total of 1000×10000, or ten million changes put into one hundred thousand generations at the source replica. Consequently, the GenerationPartitionMapping table 308 will have one hundred thousand entries with sets of one hundred generations, each mapping to a single partition.

When a first destination replica with a distinct partition_id=P1001 synchronizes with the source replica, since all generations map to partitions corresponding to partitions P1-P1000, all of the one hundred thousand generations (and hence ten million changes) will be irrelevant to first destination replica with partition_id=P1001. If, on the other hand, a second destination replica with partition_=P500 synchronizes with the source replica, synchronization will effectively enumerate exactly one hundred generations that are relevant to the second destination replica (with partition_id=P500), and hence, propagate exactly ten thousand changes to second the destination replica.

Another advantage of the generations partitioning optimization is that since it controls the amount of synchronization metadata to be examined by a destination replica relative to the number of changes that are relevant to the partition, the duration of the synchronization session between the source replica and destination replica is predictable. By way of example, assume a destination replica with partition_id=P500 is not synchronized with a source replica for a long duration. In the existing versions of merge replication, this destination replica is penalized when finally synchronizing with the source replica, since it will have to enumerate all generations that have accumulated at the source replica. That is, if for example, one thousand destination replicas propagated one hundred generations each, this set of relevant and irrelevant generations totals one hundred thousand generations, which is significant. Once the one hundred thousand generations are considered, the "per synchronization session partition computation" algorithm would eliminate the irrelevant changes, and only relevant changes would propagate to the destination replica Consider a scenario where the generations have been partitioned into relevant partition identifiers. In accordance with aspects of the present invention, the synchronization session with the destination replica (e.g., partition_id=P500) will not be penalized, since it can immediately identify relevant generations. The impact on the networking characteristics of generation partitioning is significant, since propagation of irrelevant generations to the destination replica is avoided. Continuing with the example, this amounts to a savings of one hundred thousand minus one hundred, or 99,900 generations (generations that do not need to be propagated to a destination replica). Whenever local changes are made at a source replica, even if the changes are relevant to only a single partition or sets of partitions, it may be more preferable and more efficient to propagate these local changes as global generations. The premise on which this is based is that changes made at the source replica are relevant to virtually all the destination replicas, whereas changes made at destination replicas are only relevant to other destination replicas that share the same partition_id.

It is appreciated that aspects of the present invention have other applications. For example, in a server form that can be accessed by a number of client users, the partition changes that occur for a particular user of a first server can be utilized to determine if the user should be disassociated with the first server and reassociated with a second server. This "associating" process could be performed automatically according to predetermined criteria such that once changes are tracked as being made to certain fields of database information, the associating process is automatically triggered.

It is to be further appreciated that although the invention has been described in the context of database changes, it is not limited to such, but has application to any environment where data synchronization is required across disparate sources. For example, the present invention has application to directory services where the names, profile information, user accounts, network permissions, and machine addresses of every user and resource on the network can be reconciled.

Figure 6:
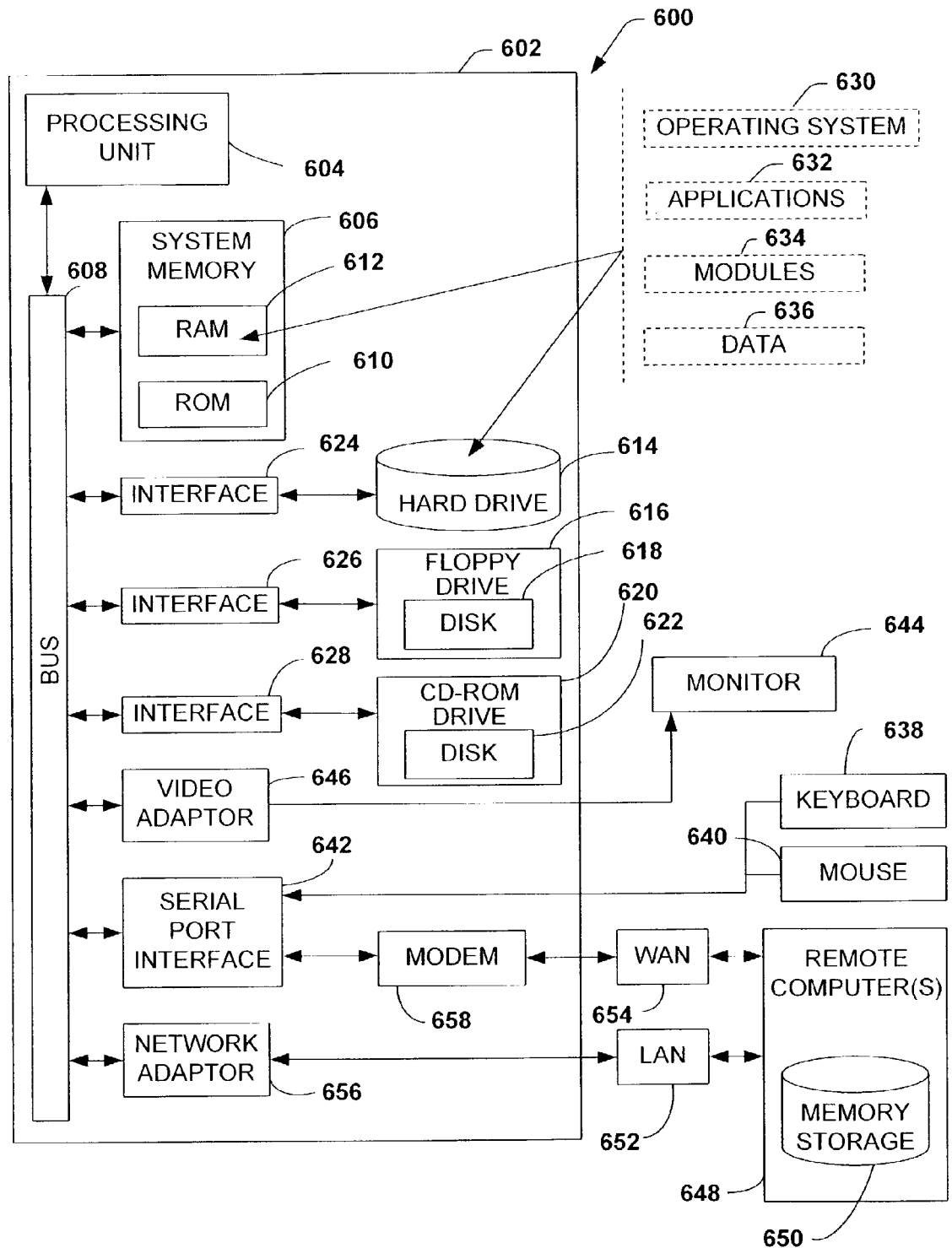
FIG. 6 illustrates a block diagram of a computer operable to execute the disclosed architecture.

Referring now to FIG. 6, there is illustrated a block diagram of a computer operable to execute the disclosed architecture. In order to provide additional context for various aspects of the present invention, FIG. 6 and the following discussion are intended to provide a brief, general description of a suitable computing environment 600 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 6, the exemplary environment 600 for implementing various aspects of the invention includes a computer 602, the computer 602 including a processing unit 604, a system memory 606 and a system bus 608. The system bus 608 couples system components including, but not limited to the system memory 606 to the processing unit 604. The processing unit 604 may be any of various commercially available processors. Dual microprocessors and other multi-processor architectures also can be employed as the processing unit 604.

The system bus 608 can be any of several types of bus structure including a memory bus or memory controller, a peripheral bus and a local bus using any of a variety of commercially available bus architectures. The system memory 606 includes read only memory (ROM) 610 and random access memory (RAM) 612. A basic input/output system (BIOS), containing the basic routines that help to transfer information between elements within the computer 602, such as during start-up, is stored in the ROM 610.

The computer 602 further includes a hard disk drive 614, a magnetic disk drive 616, (e.g., to read from or write to a removable disk 618) and an optical disk drive 620, (e.g., reading a CD-ROM disk 622 or to read from or write to other optical media). The hard disk drive 614, magnetic disk drive 616 and optical disk drive 620 can be connected to the system bus 608 by a hard disk drive interface 624, a magnetic disk drive interface 626 and an optical drive interface 628, respectively. The drives and their associated computer-readable media provide nonvolatile storage of data, data structures, computer-executable instructions, and so forth. For the computer 602, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 612, including an operating system 630, one or more application programs 632, other program modules 634 and program data 636. It is appreciated that the present invention can be implemented with various commercially available operating systems or combinations of operating systems.

A user can enter commands and information into the computer 602 through a keyboard 638 and a pointing device, such as a mouse 640. Other input devices (not shown) may include a microphone, an IR remote control, a joystick, a game pad, a satellite dish, a scanner, or the like. These and other input devices are often connected to the processing unit 604 through a serial port interface 642 that is coupled to the system bus 608, but may be connected by other interfaces, such as a parallel port, a game port, a universal serial bus ("USB"), an IR interface, etc. A monitor 644 or other type of display device is also connected to the system bus 608 via an interface, such as a video adapter 646. In addition to the monitor 644, a computer typically includes other peripheral output devices (not shown), such as speakers, printers etc.

The computer 602 may operate in a networked environment using logical connections to one or more remote computers, such as a remote computer(s) 648. The remote computer(s) 648 may be a workstation, a server computer, a router, a personal computer, portable computer, microprocessor-based entertainment appliance, a peer device or other common network node, and typically includes many or all of the elements described relative to the computer 602, although, for purposes of brevity, only a memory storage device 650 is illustrated. The logical connections depicted include a LAN 652 and a WAN 654. Such networking environments are commonplace in offices, enterprise-wide computer networks, intranets and the Internet.

When used in a LAN networking environment, the computer 602 is connected to the local network 652 through a network interface or adapter 656. When used in a WAN networking environment, the computer 602 typically includes a modem 658, or is connected to a communications server on the LAN, or has other means for establishing communications over the WAN 654, such as the Internet. The modem 658, which may be internal or external, is connected to the system bus 608 via the serial port interface 642. In a networked environment, program modules depicted relative to the computer 602, or portions thereof, may be stored in the remote memory storage device 650. It will be appreciated that the network connections shown are exemplary and other means of establishing a communications link between the computers may be used.

Figure 7:
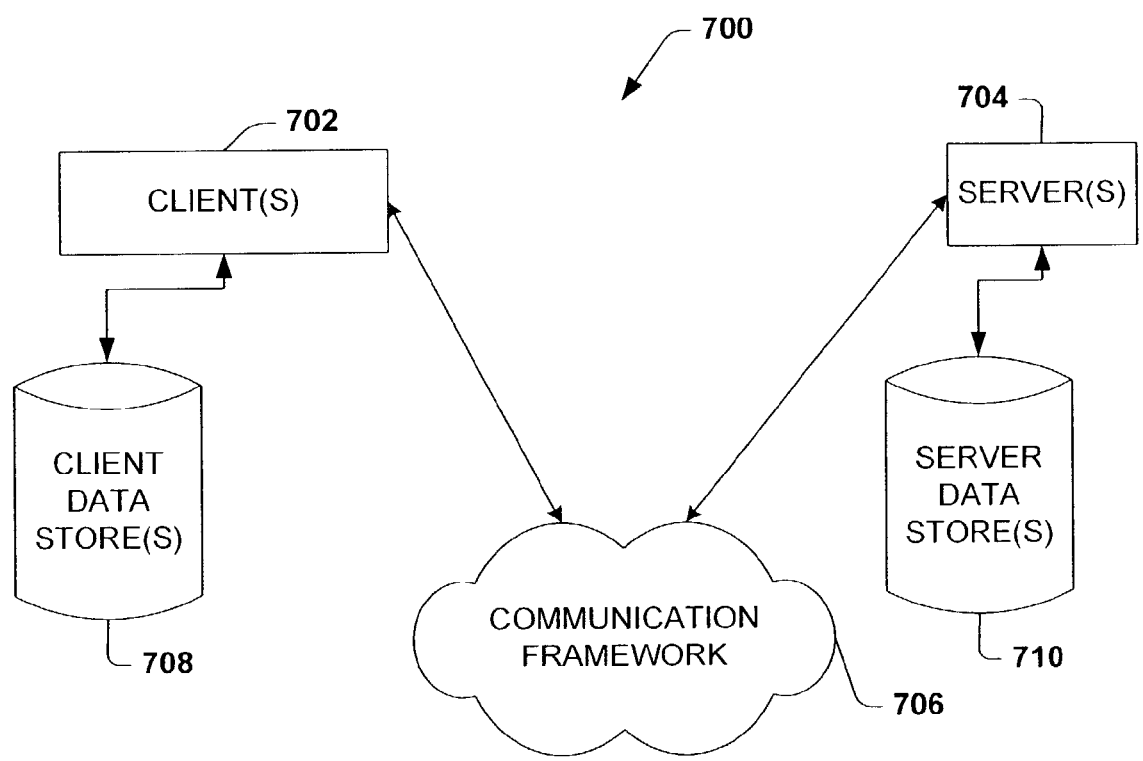
FIG. 7 illustrates a schematic block diagram of a sample computing environment in accordance with the present invention.

Referring now to FIG. 7, there is illustrated a schematic block diagram of a sample computing environment 700 in accordance with the present invention. The system 700 includes one or more client(s) 702. The client(s) 702 can be hardware and/or software (e.g., threads, processes, computing devices). The client(s) 702 can house cookie(s) and/or associated contextual information by employing the present invention, for example. The system 700 also includes one or more server(s) 704. The server(s) 704 can also be hardware and/or software (e.g., threads, processes, computing devices).

The servers 704 can house threads to perform transformations by employing the present invention, for example. One possible communication between a client 702 and a server 704 may be in the form of a data packet adapted to be transmitted between two or more computer processes. The data packet may include a cookie and/or associated contextual information, for example. The system 700 includes a communication framework 706 that can be employed to facilitate communications between the client(s) 702 and the server(s) 704. The client(s) 702 are operably connected to one or more client data store(s) 708 that can be employed to store information local to the client(s) 702 (e.g., cookie(s) and/or associated contextual information). Similarly, the server(s) 704 are operably connected to one or more server data store(s) 710 that can be employed to store information local to the servers 704.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer readable storage medium that facilitates synchronization in a client/server environment using a plurality of destination replicas at a plurality of clients, comprising:

a receiver component that receives information relating to a partition update in data from a first destination replica at a first client to a source replica, wherein the partition update represents all rows of a partition of the first replica that have been modified since the last synchronization of the first destination replica, the receiver component assigns a generation identifier to all of the rows of the partition update, wherein the value of the generation identifier is the same for all rows of the partition update, wherein a partition is a subset of rows of replica data;

a determination component that propagates the partition update and determines a priori to synchronization by other clients which of the other clients' destination replicas will be affected by the partition update, wherein the determination component employs a set based query on server tables to make the determination, wherein the server tables comprise a partition metadata table, a current changes metadata table, and a past changes metadata table, wherein the partition metadata table identifies each partition that is relevant to each destination replica, the current changes metadata table identifies each row that is currently part of each partition, the past changes metadata table identifies each row that was previously part of each partition; and an update component that where upon synchronization by the clients, each client determined to be affected by the partition change is updated with all generations of changes that have not propagated to the client to facilitate partition consistency across the plurality of clients, the update component employs a generation partition mapping table that identifies each generation identifier that is relevant to each partition and a generation metadata table the identifies each generation that has been propagated to each client to identify the changes that have not propagated to each client.

2. The system of claim 1, the information relating to the partition update received in the form of replication metadata.

3. The system of claim 1, the server tables further comprising a row metadata table that identifies the time of each change to each row.

4. The system of claim 1, the partitions of the client and the first destination replica aligned such that a row undergoing updating is updated.

5. The system of claim 1, a partition of a client aligned with the first destination replica such that a row undergoing updating is updated, and expanded utilizing a filter to get related rows from joined tables.

6. The system of claim 5, the row expanded utilizing the filter, which is a join filter, the expansion computation in accordance with a set-based query.

7. The system of claim 5, the filter is a dynamic row filter.

8. The system of claim 1, the partition updates comprise a destination replica of metadata that is membership information persisted for synchronization with the other clients that are affected by the partition change.

9. The system of claim 8, the persisted membership information including a mapping between a row identifier of a changed row and a partition identity of a respective replica of the other clients.

10. The system of claim 8, the persisted membership information that includes at least one of a row deletion and a row update requires row information about past memberships.

11. The system of claim 1, the partition updates propagated in accordance with a synchronization anchor value such that only the other clients that were not updated during the last synchronization get updated.

12. The system of claim 1, the partition updates tracked with a change tracking logic that processes changes in the partition when a row of the first destination replica is at least one of updated, inserted, and deleted.

13. The system of claim 1, further comprising a change enumeration mechanism that enumerates changes in the partition update in the other clients during synchronization therewith that processes changes in the other clients that occurred since the last synchronization.

14. The system of claim 13, a delete and a partition update enumerated by selecting a row whose synchronization anchor is newer than the negotiated synchronization anchor of the session.

15. The system of claim 14, the row selected from metadata that reflects past changes of the row.

16. The system of claim 13, an insert and a partition update enumerated by selecting a row whose synchronization anchor is more new than the negotiated synchronization anchor of the session.

17. The system of claim 16, the row selected from metadata that reflects current changes of the row.

18. The system of claim 1, further comprising a synchronization anchor assigned to changes propagated from the first destination replica, the synchronization anchor in the form of generation identification information.

19. The system of claim 18, the generation identification information of a first partition overwritten with generation identification information of a second partition when the respective client synchronizes.

20. A server based system comprising the system of claim 1.

21. A network comprising the system of claim 1.

22. A method of facilitating synchronization in a client/server environment using a plurality of destination replicas at a plurality of clients, comprising:
receiving information relating to a partition update in data from a first destination replica, wherein the partition update represents all rows of a partition of the first replica that have been modified since the last synchronization of the first destination replica, wherein a partition is a subset of rows of replica data;
assigning a generation identifier to all of the rows of the partition update, wherein the value of the generation identifier is the same for all rows of the partition update;
determining a priori to synchronization by other clients' destination replicas, which other clients will be affected by the partition update, wherein the determining employs a set based query on server tables to make a determination, wherein the server tables comprise a partition metadata table, a current changes metadata table, and a past changes metadata table, wherein the partition metadata table identifies each partition that is relevant to each destination replica, the current changes metadata table identifies each row that is currently part of each partition, the past changes metadata table identifies each row that was previously part of each partition;
upon synchronization by the clients, employing a generation partition mapping table that identifies each generation identifier that is relevant to each partition and a generation metadata table the identifies each generation that has been propagated to each client to identify generation of changes that have not propagated to each client; and
updating the clients determined to be affected by the partition change with all generations of changes that have not propagated to each client to facilitate partition consistency across the plurality of clients.

23. The method of claim 22, receiving the information relating to the partition update in the form of replication metadata.

24. The method of claim 22, the server tables further comprising a row metadata table that identifies the time of each change to each row.

25. The method of claim 22, further comprising the step of aligning partitions of the client and the first destination replica such that a row undergoing updating is updated.

26. The method of claim 22, further comprising the step of aligning partitions of the client and the first destination replica such that a row undergoing updating is updated, and expanded utilizing a filter to get related rows from joined tables.

27. The method of claim 26, the row expanded utilizing the filter, which is a join filter, the expansion computation in accordance with a set-based query.

28. The method of claim 26, the filter is a dynamic row filter.

29. The method of claim 22, the partition updates comprise a partial replica of metadata that is membership information persisted for synchronization with the other clients that are affected by the partition change.

30. The method of claim 29, the persisted membership information including a mapping between a row identifier of a changed row and a partition identity of a respective replica of the other clients.

31. The method of claim 29, the persisted membership information that includes at least one of a row deletion and a row update requires row information about past memberships.

32. The method of claim 22, the partition updates propagated in accordance with a synchronization anchor value such that only the other clients that were not updated during the last synchronization get updated.

33. The method of claim 22, the partition updates tracked with a change tracking logic that processes changes in the partition when a row of the first destination replica is at least one of updated, inserted, and deleted.

34. The method of claim 22, further comprising the step of enumerating changes in the other clients during synchronization therewith utilizing a change enumeration mechanism that processes changes in the other clients that occurred since the last synchronization.

35. The method of claim 34, a delete and a partition update enumerated by selecting a row whose synchronization anchor is newer than the negotiated synchronization anchor of the session.

36. The method of claim 35, the row selected from metadata that reflects past changes of the row.

37. The method of claim 34, an insert and a partition update enumerated by selecting a row whose synchronization anchor is newer than the negotiated synchronization anchor of the session.

38. The method of claim 37, the row selected from metadata that reflects current changes of the row.

39. The method of claim 22, further comprising the step of assigning a synchronization anchor to changes propagated from the first destination replica, the synchronization anchor in the form of generation identification information.

40. The method of claim 39, the generation identification information of a first partition overwritten with generation identification information of a second partition when the respective client synchronizes.

41. A computer-readable medium having stored thereon computer executable instructions for performing the method of claim 22.

42. A system embodied on a computer readable storage medium that facilitates synchronization in a client/server environment using replicas, comprising:
- means for receiving information relating to a partition update in data from a first replica at a first client, wherein the partition update represents all rows of the first replica that have been modified since the last synchronization of the first replica;
- means for assigning a generation identifier to all of the rows of the partition update, wherein the value of the generation identifier is the same for all rows of the partition update, wherein a partition is a subset of rows of replica data;
- means for determining a priori to synchronization by other clients, which other clients' replicas will be affected by the partition update, wherein the determining employs a set based query on server tables to make the determination, wherein the server tables comprise a partition metadata table, a current changes metadata table, and a past changes metadata table, wherein the partition metadata table identifies each partition that is relevant to each destination replica, the current changes metadata table identifies each row that is currently part of each partition, the past changes metadata table identifies each row that was previously part of each partition;
- upon synchronization by the clients, means employing a generation partition mapping table that identifies each generation identifier that is relevant to each partition and a generation metadata table the identifies each generation that has been propagated to each client to identify generations of changes that have not propagated to each client; and
- means for updating the clients determined to be affected by the partition change with all generations of changes that have not propagated to each client to facilitate partition consistency across the plurality of clients.

43. A method of facilitating synchronization in a client/server environment using replicas, comprising:
- receiving information relating to a partition update in data from a first replica, the received information in the form of replication metadata that is membership information of all changed rows of the first replica since the last synchronization of the first replica persisted for synchronization with the other clients, the replication metadata including a generation identifier to all of the changes rows of the partition update, wherein the value of the generation identifier is the same for all rows of the partition update, wherein a partition identifies a subset of replica data;
- determining a priori to synchronization by other clients, which other clients will be affected by the partition update, wherein the determining employs a set based query on server tables to make the determination, wherein the server tables comprise a partition metadata table, a current changes metadata table, and a past changes metadata table, wherein the partition metadata table identifies each partition that is relevant to each destination replica, the current changes metadata table identifies each row that is currently part of each partition, the past changes metadata table identifies each row that was previously part of each partition;
- upon synchronization by the clients, employing a generation partition mapping table that identifies each generation identifier that is relevant to each partition and a generation metadata table the identifies each generation that has been propagated to each client to identify generation of changes that have not propagated to each client; and
- updating the clients determined to be affected by the partition change with all generations of changes that have not propagated to each client to facilitate partition consistency across the plurality of clients.

44. A system embodied on a computer readable storage medium that facilitates synchronization of data collections using replicas, comprising:
- a receiver component for receiving information relating to a partition update in data from a first replica, wherein the partition represents all rows of the first replica that have been modified since the last synchronization of the first replica, the receiver component assigns a generation identifier to all of the rows of the partition update, wherein the value of the generation identifier is the same for all rows of the partition update, wherein a partition identifies a subset of replica data;
- a determination component determining a priori the synchronization by other destination data collections, which other destination data collections will be affected by the partition change, wherein the determination component employs a set based query on server tables to make the determination, wherein the server tables comprise a partition metadata table, a current changes metadata table, and a past changes metadata table, wherein the partition metadata table identifies each partition that is relevant to each destination replica, the current changes metadata table identifies each row that is currently part of each partition, the past changes metadata table identifies each row that was previously part of each partition; and an update component where upon synchronization by the destination data collections, each destination data collection determined to be affected by the partition change is updated with all generations of changes that have not propagated to the destination data collection to facilitate partition consistency across the plurality of destination data collections, the update component employs generation identifiers and a generation partition mapping table that identifies each generation identifier that is relevant to each partition and a generation metadata table the identifies each generation that has not propagated to each destination data collection.

45. The system of claim 44, the information relating to the partition update received in the form of replication metadata.

* * * * *